No. 782,804. PATENTED FEB. 14, 1905.
M. F. WIEDEMANN.
MOUNTING FOR AWNING POLES.
APPLICATION FILED NOV. 23, 1904.
2 SHEETS—SHEET 2.
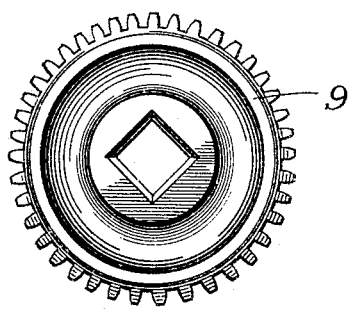
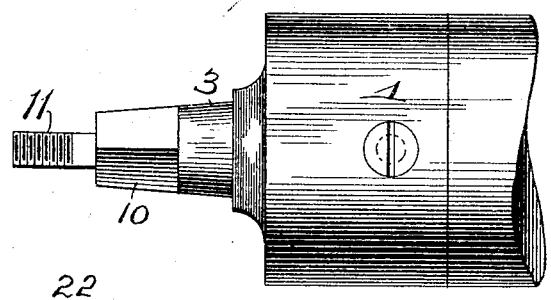
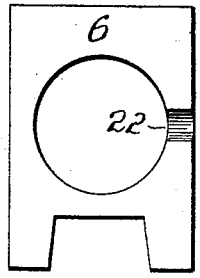 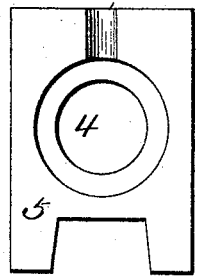 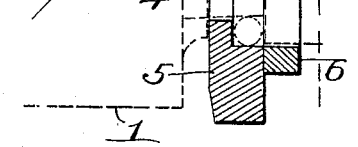
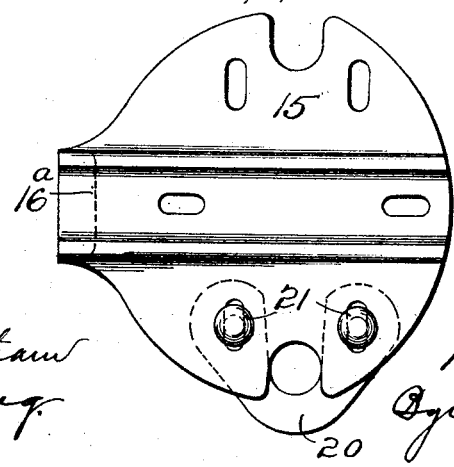
WITNESSES
INVENTOR
M. F. Wiedemann
By H. A. Seymour
Attorney No. 782,804.

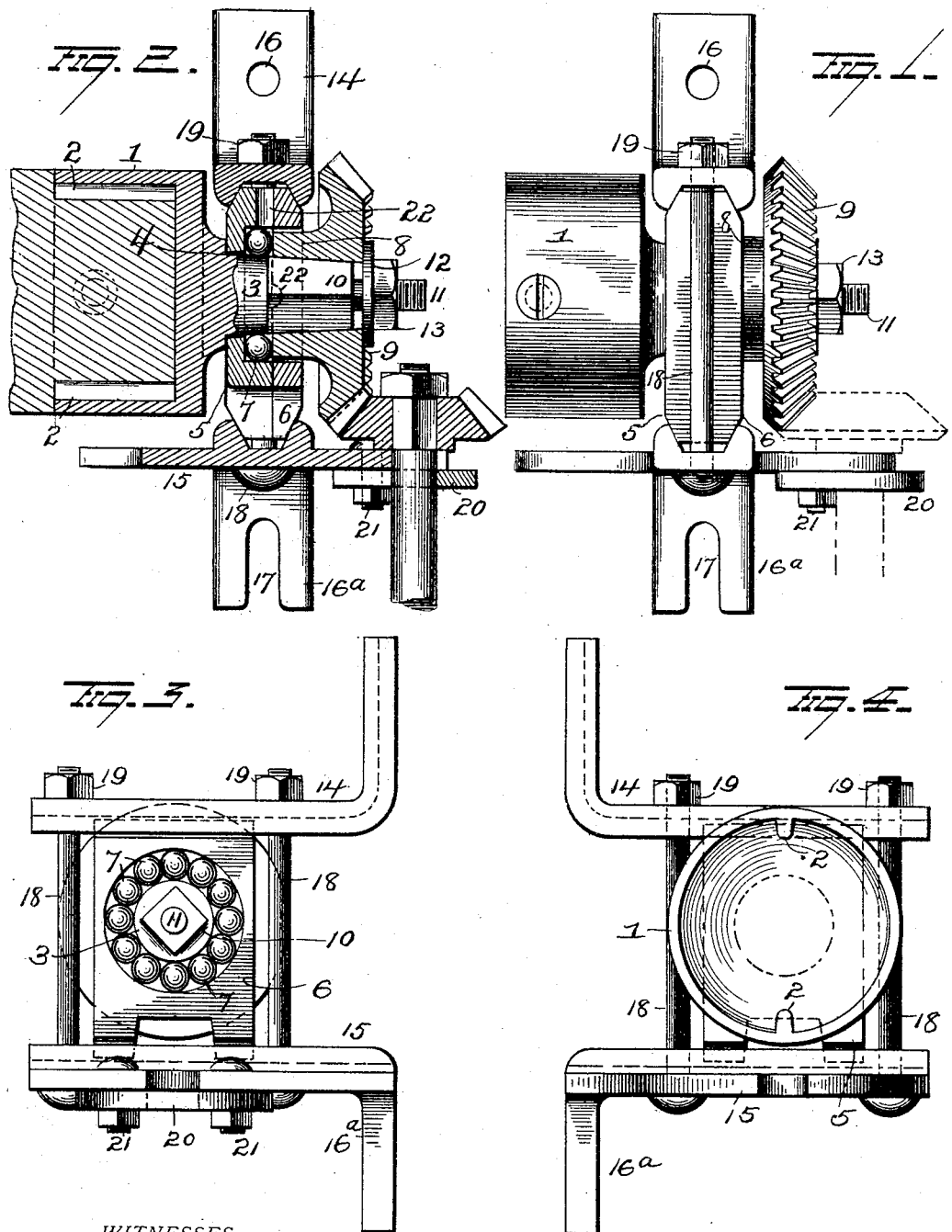

Patented February 14, 1905.

UNITED STATES PATENT OFFICE.

MARTIN F. WIEDEMANN, OF BURLINGTON, IOWA.

MOUNTING FOR AWNING-POLES.

SPECIFICATION forming part of Letters Patent No. 782,804, dated February 14, 1905.

Original application filed April 9, 1904, Serial No. 202,407. Divided and this application filed November 23, 1904. Serial No. 234,037.

*To all whom it may concern:*

Be it known that I, MARTIN F. WIEDEMANN, of Burlington, in the State of Iowa, have invented certain new and useful Improvements in Mountings for Awning-Poles; and I do hereby declare the following to be a full, clear, and exact description of the invention, such as will enable others skilled in the art to which it appertains to make and use the same.

My invention relates to improvements in mountings for awning-poles, and more particularly to an antifriction-bearing therefor, this application being a division of application for patent filed by me on the 9th day of April, 1904, and designated by Serial No. 202,407.

The object of this invention is to provide a simple and efficient construction of devices for mounting an awning-pole in such manner as to reduce friction to a minimum.

With this object in view the invention consists in certain novel features of construction and combinations and arrangements of parts, as hereinafter set forth, and pointed out in the claims.

In the accompanying drawings, Figure 1 is a view in elevation illustrating my improvements. Fig. 2 is a view in longitudinal section. Fig. 3 is an end view with gearing removed. Fig. 4 is a view of the pole-receiving cup and journal thereon. Fig. 5 is a view of the beveled pinion, and Figs. 6, 7, 8, and 9 are detail views of the brackets and bearing-blocks.

1 represents a metal cup adapted to receive the end of an awning-roller and having internal ribs 2 to enter grooves in the roller and compel them to turn together, and openings are provided in said cup for the reception of screws to secure the cup onto the end of the roller.

Cup 1 at the center of its end is made with an integral journal 3, projected through an opening 4 is a bearing-block 5. This block 5 is made with a circular recess alining with a circular opening in another block 6 beside the same to form a journal-box to receive balls 7, located around journal 3 between the same and flat wall of the journal-box and prevented from escape therefrom by the end wall of the recess in block 5, in which opening 4 is provided. The balls are held against escape from the other side of the box by the hub 8 of a beveled gear 9, said hub fitting in the box and made with an angular bore to receive the angular extension 10 on journal 3. A threaded bolt or rod 11 is secured in the end of extension 10, projects outward beyond gear 9, and has a washer 12 and nut 13 thereon to firmly secure the gear on the journal extension.

The blocks 5 and 6 are supported in upper and lower brackets 14 and 15, respectively, upper bracket 14 comprising a channel-iron bent at right angles to provide a member against the wall or other support (a bolt-opening 16 being provided in this portion of the bracket) and an outwardly-projecting portion to receive the beveled edges of the blocks 5 and 6 in their depending side flanges and when forced thereinto tightly clamp the blocks together.

The lower bracket 15 comprises a plate having parallel ribs on its upper face to receive and bind the blocks 5 and 6 between them, and a depending tongue 16ᵃ is provided at the inner end of the plate and provided with a recess or slot 17 to receive a bolt to secure it to a wall or other support.

Brackets 14 and 15 are provided with alined openings for clamping-bolts 18 at opposite ends of the blocks, so that when the nuts 19 on said bolts are screwed home said blocks will be tightly clamped between the brackets and the blocks clamped together owing to the cam action of the bracket webs or flanges against the beveled edges of the blocks.

The plate or bracket 15 is recessed at opposite sides, and a clip 20 is adapted to be secured to said plate at either side by bolts 21, passed through openings in the plate and clip, and the recesses therein coöperate to form a bearing for the vertical rod or shaft carrying a beveled pinion for driving gear 9 to turn the awning-roller. The clip 20 can be shifted from side to side of bracket 15 according to the position of the several parts.

The blocks 5 and 6 are made with recesses 22, which when together form an opening through which the balls may be inserted. These recesses 22 when the blocks are in normal position are out of alinement, and the blocks must be removed from between the brackets 14 and 15 and one given a quarter-turn on the journal to bring the openings together.

A great many slight changes might be made in the general form and arrangement of the several parts described without departing from my invention, and hence I would have it understood that I do not wish to restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with brackets spaced apart, of blocks secured between said brackets, a journal mounted in a bearing in said blocks, one of said blocks having an annular recess in its inner face, an element having an angular bore to receive an angular portion of the journal, the hub of said element entering one of said blocks and terminating outwardly from the inner wall of said annular recess, and antifriction-balls in said annular recess.

2. The combination of two blocks, disposed face to face, one of said blocks having an annular recess, means for securing said blocks together, a journal passing through said blocks, an element secured to the journal and having a hub entering one of said blocks and forming one wall of said annular recess, and antifriction-balls disposed in said annular recess and bearing against the journal.

3. In a device of the class described, the combination with brackets spaced apart, of a bearing comprising two blocks disposed face to face and held together by said brackets, said blocks having openings, a journal passing through said openings one of said blocks having an annular recess in its inner face, antifriction-balls in said recess and bearing against the journal, both of said blocks having radial recesses communicating with the annular recess, and an element secured to the journal and having a hub entering one of said blocks.

In testimony whereof I have signed this specification in the presence of two subscribing witnesses.

MARTIN F. WIEDEMANN.

Witnesses:
 JNO. J. SEERLEY,
 CHAS. C. CLARK.